(12) United States Patent
Baxter et al.

(10) Patent No.: US 10,408,661 B2
(45) Date of Patent: Sep. 10, 2019

(54) APPARATUS AND METHOD FOR MEASURING THE LEVEL OF A LIQUID

(71) Applicants: Larry Baxter, Orem, UT (US); David Frankman, Provo, UT (US)

(72) Inventors: Larry Baxter, Orem, UT (US); David Frankman, Provo, UT (US)

(*) Notice: Subject to any disclaimer, the term of this patent is extended or adjusted under 35 U.S.C. 154(b) by 197 days.

(21) Appl. No.: 15/463,764

(22) Filed: Mar. 20, 2017

(65) Prior Publication Data

US 2018/0266872 A1 Sep. 20, 2018

(51) Int. Cl.
*G01F 23/24* (2006.01)
*G01F 23/00* (2006.01)

(52) U.S. Cl.
CPC ........ *G01F 23/247* (2013.01); *G01F 23/0076* (2013.01); *G01F 23/248* (2013.01)

(58) Field of Classification Search
CPC .. G01F 23/247; G01F 23/0076; G01F 23/248; G01S 11/14
See application file for complete search history.

(56) References Cited

U.S. PATENT DOCUMENTS

| | | | | | |
|---|---|---|---|---|---|
| 4,449,404 | A | * | 5/1984 | Bohme | G01F 23/246 73/295 |
| 5,035,140 | A | * | 7/1991 | Daniels | B08B 3/12 73/290 V |
| 5,167,153 | A | * | 12/1992 | McQueen | G01F 1/684 338/22 R |
| 6,192,751 | B1 | * | 2/2001 | Stein | G01F 23/2962 340/617 |
| 2002/0011105 | A1 | * | 1/2002 | Snelling | G01F 23/246 73/295 |
| 2004/0149030 | A1 | * | 8/2004 | Heilig | G01F 23/2967 73/290 V |
| 2004/0151629 | A1 | * | 8/2004 | Pease | B01L 3/5027 422/68.1 |

* cited by examiner

*Primary Examiner* — Daniel S Larkin
*Assistant Examiner* — Anthony W Megna Fuentes

(57) ABSTRACT

An apparatus and method for measuring the level of a liquid. The apparatus comprises an elongated, thermally conductive probe with an upper region to be disposed above the surface of the liquid, a lower region to be disposed below the surface of the liquid, and a middle region. A heater adds heat to the probe, and temperature sensors may measure the temperature of the probe in the upper and lower regions. An actuator may introduce a vibration into the probe at a first location, and a vibration sensor senses the arrival of the vibration at a second location. Electrical circuitry controls may be used to receive signals and make measurements. The liquid level may be computed by electrical circuitry controls via an equation.

8 Claims, 5 Drawing Sheets

APPARATUS AND METHOD FOR MEASURING THE LEVEL OF A LIQUID

TECHNICAL FIELD

The disclosure relates generally to the field of liquid level measurement. Specifically, the disclosure relates to an apparatus and method for performing such measurements.

BACKGROUND

Various methods and means exist for measuring the level of liquid substances in a vessel or reservoir. Some methods include: sight glasses, measuring hydrostatic pressure, and using a strain gauge device. The need still exists for an accurate, cost-effective, and quick method and accompanying apparatus for measuring the level of substances in a vessel.

BRIEF SUMMARY

An apparatus for measuring the level of a liquid is described. The apparatus includes an elongated probe comprising a thermally conductive material. The probe comprises an upper region intended to be disposed above the surface of the liquid, a lower region intended to be disposed below the surface of the liquid, and a middle region between the upper region and the lower region. A heater is configured to add heat to the probe and thereby raise the average temperature along the length thereof, and temperature sensors are configured to measure the temperature of the probe in the upper region and in the lower region. An actuator is configured to introduce a vibration into the probe at a first location along the length of the probe, and a vibration sensor is configured to sense the arrival of the vibration at a second location along the length of the probe. The apparatus also includes electrical circuitry configured to perform at least the functions of controlling the heater, receiving signals from the temperature sensors, controlling the actuator, receiving signals from the vibration sensor, and measuring the time delay between the introduction of the vibration into the probe at the first location and the arrival of the vibration in the probe at the second location.

A method of measuring the level of a liquid includes providing an elongated probe as described above, the upper region of the probe being disposed above the surface of the liquid and the lower region of the probe being disposed below the surface of the liquid. Heat is then added to the probe to raise the average temperature along the length thereof, and the temperature of the probe is measured in the upper region and in the lower region. After the difference between the measured temperature of the probe in the upper region and the measured temperature of the probe in the lower region reaches a predetermined value, such as any value between 0 degrees Kelvin and 5000 degrees Celsius, a vibration may be introduced into the probe at a first location along the length of the probe. The arrival of the vibration at a second location along the length of the probe may then be sensed, and the propagation time of the vibration may be measured as the time delay between the introduction of the vibration into the probe at the first location and the arrival of the vibration in the probe at the second location. The level of the liquid may then be computed as a function of the distance the vibration propagated through the probe to get from the first location to the second location, the measured propagation time, the measured temperature of the probe in the upper region, the measured temperature of the probe in the lower region, and the known temperature dependence of the speed of propagation of the vibration along the probe.

These and other features and objects of the present invention will become more fully apparent from the following description and appended claims, or may be learned by the practice of the invention as set forth hereinafter.

BRIEF DESCRIPTION OF THE DRAWINGS

To further clarify the above and other features and advantages of the present invention, a more particular description of the invention will be rendered by reference to specific embodiments thereof which are illustrated in the appended drawings. It is appreciated that these drawings depict only exemplary embodiments of the invention and are therefore not to be considered limiting of its scope. These drawings are not necessarily to scale.

DETAILED DESCRIPTION

Figure 1:
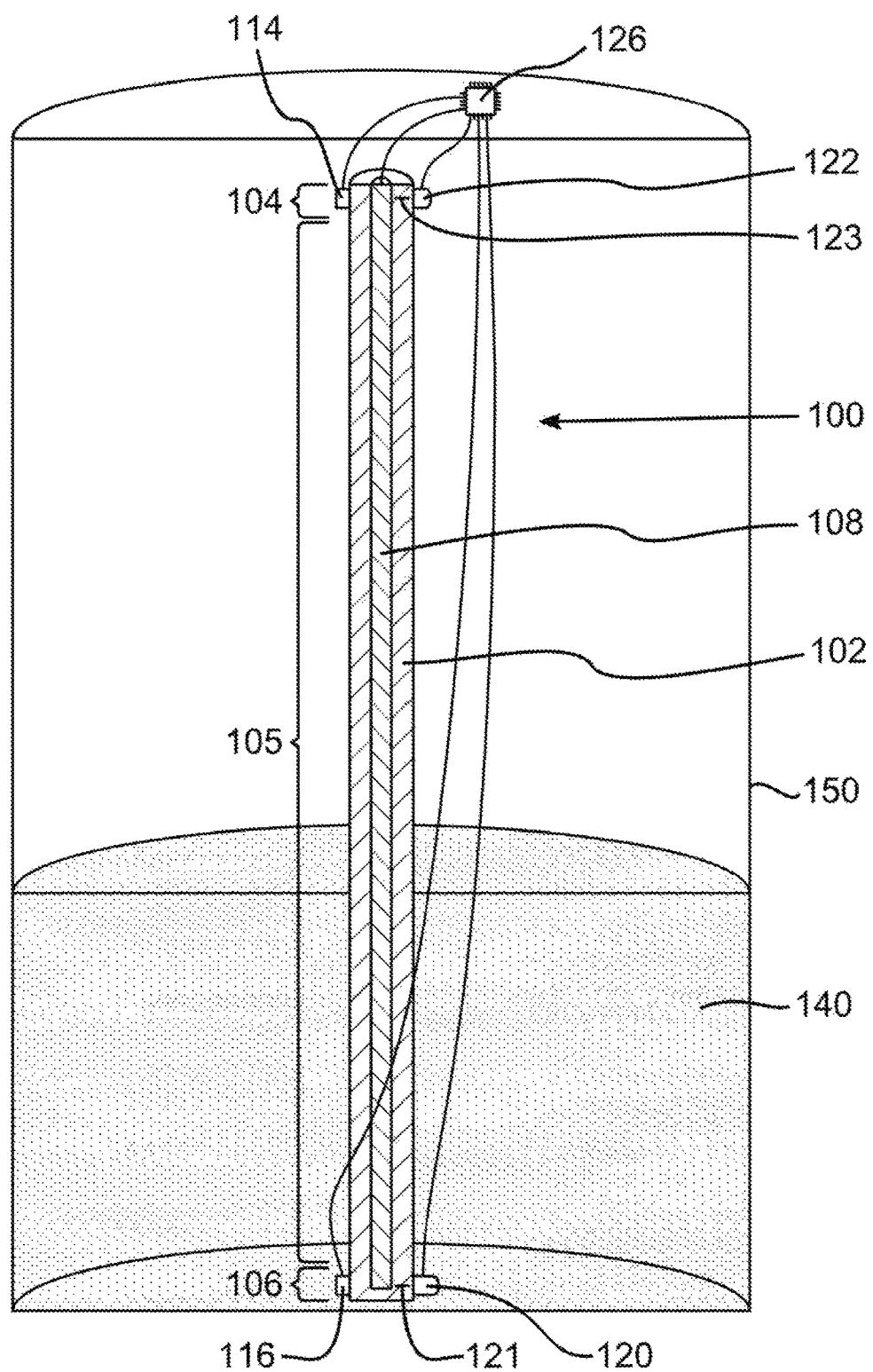
FIGS. 1 through 4 schematically illustrate perspective sectional views of an apparatus for measuring the level of a liquid in accordance with various exemplary embodiments; in the preferred embodiments the probe of the apparatus may be generally cylindrical; to generate these cross-sectional views of the FIGS. 1 through 4, a vertically-aligned plane running perpendicular intersects a central diameter of the top of the probe, and the line of sight may be perpendicular to the vertically-aligned plane.

Reference will now be made to the exemplary embodiments illustrated in the drawings, and specific language will be used herein to describe the same. It will nevertheless be understood that these are merely representative examples of the invention and are not intended to limit the scope of the invention as claimed. Those of skill in the art will recognize that the elements and steps of the invention as described by example in the drawings could be arranged and designed in a wide variety of different configurations without departing from the substance of the claimed invention. Alterations and further modifications of the inventive features illustrated herein, and additional applications of the principles of the invention as illustrated herein, which would occur to one skilled in the relevant art and having possession of this disclosure, are to be considered within the scope of the invention.

FIG. 1 illustrates an example of an apparatus 100 for measuring the level of a liquid 140 according to an embodiment of the invention. For illustration purposes, the liquid 140 is shown contained in a vessel 150, but the structure containing the liquid is not part of the claimed invention and can be any form of man-made or naturally-occurring container or reservoir.

A feature of the apparatus 100 may be an elongated probe 102 comprising a thermally conductive material. The probe 102 comprises an upper region 104 that may be disposed above the surface of the liquid 140, a lower region 106 that may be disposed below the surface of the liquid 140, and a middle region 105 between the upper region 104 and the lower region 106. The middle region 105 more or less defines the usable measuring region of the probe. Even though the example in FIG. 1 shows these three referenced regions 104-106 as being contiguous and covering the entire length of the probe 102, such contiguity and entirety of coverage on the probe are not requirements of the invention (although the probe 102 may itself be a mechanically contiguous feature). Also, the ratio of the lengths of these three referenced regions 104-106 as illustrated in FIG. 1 is only exemplary and not prescriptive, as this ratio can be varied widely by one skilled in the art to accommodate the design and performance parameters specific to the implementation of interest.

The apparatus 100 may also include a heater 108 configured to add heat to the probe 102 and thereby raise the average temperature along the length thereof. Because the probe 102 comprises a thermally conductive material, in the absence of the liquid 140 the temperature of the probe would be expected to be relatively uniform along its length, especially after the heater has been turned off and a reasonable equilibration time has elapsed. As a general rule, the more thermally conductive the probe material is, and the more uniformly the heat is added along the length of the probe 102 by the heater 108, the faster the temperature will equilibrate. A preferred configuration for rapidly and uniformly adding heat to the probe is illustrated in FIG. 1, wherein the heater 108 may be configured as an elongated heating element running down the center of the probe 102. By way of example and not limitation, in one embodiment the heating element of heater 108 employs electrical resistance heating. In another embodiment the heater 108 comprises an electrical circuit that channels electrical current through the probe 102 such that the probe itself may act as an electrical resistance heating element. The foregoing list of examples is illustrative only and is not intended to be exclusive or exhaustive.

The presence of the liquid 140 in contact with the probe 102 may dramatically, or at least measurably, alter the temperature distribution along the probe, which may be the key effect that enables the measurement of the liquid level. In particular, the liquid 140 may act as a heat sink, or thermal drain, to remove heat from the probe 102 via convective heat transfer in the region of contact. More specifically, the temperature distribution along the probe 102 may be a function of the convective heat transfer coefficient of whatever fluid material is in thermal contact with that portion of the probe. For present purposes, the environment above the surface of the liquid 140 may be assumed to be gaseous or vacuum. Because liquids generally have much higher convective heat transfer coefficients than gases or vacuum, the convective heat transfer coefficient profile may change radically, or at least measurably, at the interface between the liquid 140 and the environment above it, resulting in a relatively sudden discontinuity in the temperature profile at that point, with the portion of the probe 102 that may be in contact with the liquid 140 being at a lower temperature than the portion of the probe 102 that is above the surface of the liquid 140. This may result in a corresponding discontinuity in the temperature-dependent material properties of the probe 102, including density and Young's modulus, both of which may affect the speed at which vibrations such as sound waves (i.e. longitudinal pressure waves) may propagate through the probe. Thus, a vibration propagating through the probe 102 from one end to the other may propagate at one speed before the discontinuity point and at a different speed after the discontinuity point. If the total propagation time and distance are known, as well as the speeds of propagation before and after the discontinuity point, one skilled in the art may compute the location of the discontinuity point, which may be used to determine the level of the liquid 140.

Since the speeds of propagation before and after the discontinuity point may be temperature-dependent, one may ascertain the temperatures of the probe 102 before and after the discontinuity point. Since the discontinuity point may coincide with the surface of the liquid 140, the apparatus 100 may include a temperature sensor 114 configured to measure the temperature of the probe in the upper region 104 (which by definition is intended to be disposed above the surface of the liquid) and another temperature sensor 116 configured to measure the temperature of the probe in the lower region 106 (which by definition is intended to be disposed below the surface of the liquid). These temperature sensors may comprise thermistors, thermocouples, resistance temperature detectors (RTDs), silicon bandgap temperature sensors, semiconductor-based sensors, and/or any other temperature sensing device or devices.

The requisite vibration may be produced by an actuator 120, which may be configured to introduce a vibration into the probe 102 at a first location 121 along the length of the probe. A vibration sensor 122 may be configured to sense the arrival of the vibration at a second location 123 along the length of the probe. The actuator 120 may comprise a solenoid, a piezoelectric element, and/or any other vibration-producing device, and the vibration sensor 122 may comprise a piezoelectric element and/or any other vibration-sensing device. A solenoid may generate vibrations by impacting the probe, or it may be attached directly to the probe and tuned such that its motion alone induces a vibration into the probe. Piezoelectric elements may be used in combination with probe materials capable of transmitting high-frequency vibrations.

The apparatus 100 may also include electrical circuitry 126 configured to perform at least the functions of controlling the heater 108, receiving signals from the temperature sensors 114 and 116, controlling the actuator 120, receiving signals from the vibration sensor 122, and measuring the time delay between the introduction of the vibration into the probe 102 at the first location 121 and the arrival of the vibration in the probe at the second location 123. The electrical circuitry 126 may perform other functions as well. For convenience or cost savings or other reasons, the electrical circuitry 126 may be integrated in whole or in part onto a single printed circuit board or even a single integrated circuit (IC) chip, as illustrated in FIG. 1. Note that FIG. 1 shows electrical wires connecting the IC chip to the components it controls and/or from which it receives signals, but the electrical circuitry 126 may also or alternatively employ wireless connections. Electrical circuitry of this nature is well understood in the art and needs no further elaboration here.

A method of measuring the level of a liquid using an apparatus as disclosed herein will now be presented. The method includes providing an elongated probe as described above, the upper region of the probe being disposed above the surface of the liquid and the lower region of the probe being disposed below the surface of the liquid. Heat may then be added to the probe to raise the average temperature along the length thereof, and the temperature of the probe may be measured in the upper region and in the lower region. After the difference between the measured temperature of the probe in the upper region and the measured temperature of the probe in the lower region reaches a predetermined value—which may be as small as just a few degrees or as large as dozens of degrees, depending on the specifics of the application and the apparatus—a vibration may then be introduced into the probe at a first location along the length of the probe. The arrival of the vibration at a second location along the length of the probe may then be sensed, and the propagation time of the vibration may be measured as the time delay between the introduction of the vibration into the probe at the first location and the arrival of the vibration in the probe at the second location. The level of the liquid may then be computed as a function of the distance the vibration propagated through the probe to get from the first location to the second location (referred to hereafter as $d_{total}$), the measured propagation time (referred to hereafter as $t_{total}$), the measured temperature of the probe in the upper region (referred to hereafter as $T_{upper}$), the measured temperature of the probe in the lower region (referred to hereafter as $T_{lower}$), and the known temperature dependence of the speed of propagation of the vibration along the probe (referred to hereafter as c). A more detailed discussion of this computation follows.

The measured propagation time $t_{total}$ may be expressed as the sum of the propagation time through the portion of the probe above the surface of the liquid (referred to hereafter as $t_{dry}$) and the propagation time through the portion of the probe below the surface of the liquid (referred to hereafter as $t_{wet}$):

$$t_{total} = t_{dry} + t_{wet}$$

Since propagation time t equals propagation distance d divided by speed of propagation c, this may rewritten as:

$$t_{total} = \frac{d_{dry}}{c_{dry}} + \frac{d_{wet}}{c_{wet}}$$

where $d_{dry}$ and $d_{wet}$ are the propagation distances above and below the surface of the liquid, respectively, and $c_{dry}$ and $c_{wet}$ are the speeds of propagation above and below the surface of the liquid, respectively. Solving for $d_{wet}$ and using the identity $d_{total} = d_{dry} + d_{wet}$ gives the following result:

$$d_{wet} = \frac{c_{wet}}{c_{dry} - c_{wet}} (c_{dry} t_{total} - d_{total})$$

Referring back to FIG. 1, $d_{total}$ would be the distance along the length of the probe 102 between the first location 121 (where the vibration is introduced by the actuator 120) and the second location 123 (where the vibration is sensed by the vibration sensor 122), and $d_{wet}$ would be the distance along the length of the probe 102 between the first location 121 and the surface of the liquid 140. Thus, in order to compute $d_{wet}$, which may be used to determine the level of the liquid 140 on the probe 102, it is helpful to know $c_{dry}$ and $c_{wet}$, which are be the speeds of propagation at temperatures $T_{upper}$ and $T_{lower}$, respectively. In general, the speed of propagation c of a longitudinal pressure wave along a solid rod with a diameter shorter than one wavelength may be represented with reasonable accuracy by the equation $c = \sqrt{E/\rho}$, where E is the Young's modulus of the material and $\rho$ is the density of the material, both of which are temperature-dependent properties. Thus, $c_{dry}$ and $c_{wet}$ may be determined from published and/or privately measured properties of the probe material covering the temperature range of interest.

Instead of relying solely on measured properties of the probe material to determine $c_{dry}$ and $c_{wet}$, superior accuracy may be achieved by calibrating the probe itself to characterize the temperature dependence of the speed of propagation c of the vibration along the probe. Thus, in one embodiment, a calibration step is added for this purpose.

Further improvement to the accuracy of the computation may be achieved by recognizing and accounting for thermal expansion experienced by the probe, which potentially affects both $d_{dry}$ and $d_{wet}$ (and therefore $d_{total}$). (As used in this specification and the appended claims, the term "thermal expansion" includes thermal contraction.) An example of how to account for thermal expansion is as follows: start by choosing a base temperature $T_0$ at which thermal expansion will be deemed to be zero, and measure the total propagation distance $d_{total0}$ at that temperature. Then explicitly add the thermal expansion terms into the above equations by replacing $d_{dry}$ with $d_{dry0}[1+\propto (T_{upper} - T_0)]$ and replacing $d_{wet}$ with $d_{wet0}[1+\propto (T_{lower} - T_0)]$, where $d_{dry0}$ and $d_{wet0}$ are the values that $d_{dry}$ and $d_{wet}$ would be at the base temperature $T_0$, and $\propto$ is the coefficient of thermal expansion of the probe material in the temperature range of interest. The second equation shown above thus becomes:

$$t_{total} = \frac{d_{dry}}{c_{dry}} + \frac{d_{wet}}{c_{wet}} = \frac{d_{dry0}[1+\propto (T_{upper} - T_0)]}{c_{dry}} + \frac{d_{wet0}[1+\propto (T_{lower} - T_0)]}{c_{wet}}$$

Solving for $d_{wet0}$ and using the identity $d_{total0} = d_{dry0} + d_{wet0}$ gives us:

$$d_{wet0} = c_{wet} \left( \frac{c_{dry} t_{total} - d_{total0}[1+\propto (T_{upper} - T_0)]}{c_{dry}[1+\propto (T_{lower} - T_0)] - c_{wet}[1+\propto (T_{upper} - T_0)]} \right)$$

Replacing this into the identity $d_{wet} = d_{wet0}[1+\propto (T_{lower} - T_0)]$ gives us the corrected equation:

$$d_{wet} = c_{wet}[1+\propto (T_{lower} - T_0)]$$
$$\left( \frac{c_{dry} t_{total} - d_{total0}[1+\propto (T_{upper} - T_0)]}{c_{dry}[1+\propto (T_{lower} - T_0)] - c_{wet}[1+\propto (T_{upper} - T_0)]} \right)$$

Yet another way to improve the accuracy of the above method is to add an equilibration step, in which the heater may be turned off and the probe may be allowed a period of time, such as between 1 second and 10,000 seconds, for local temperature equilibration before final temperature measurements are made and the vibration is introduced into the probe. The purpose of this step may be to ensure sufficient temperature uniformity within the portion of the probe above the surface of the liquid and sufficient temperature uniformity within the portion of the probe below the surface of the liquid so as to achieve the desired degree of accuracy and precision in the resulting liquid level measurements produced by the apparatus. The length of the equilibration time may therefore be long enough to achieve the desired degree of temperature uniformity within each of these two portions of the probe, but not so long that the temperature difference between these two portions of the probe drops below the level necessary to achieve a measurement with the desired degree of accuracy and precision.

Returning now to a consideration of the apparatus itself, the choice of specific material or materials for the probe depends on the application, but in general the guiding considerations include chemical compatibility with the liquid or liquids of interest, relatively high thermal conductivity, and relatively strong temperature dependence for the speed of propagation c of vibrations in the material (which, as mentioned above, is a function of the Young's modulus E and density ρ of the material). By way of example and not limitation, brass, stainless steel, steel, and copper are among the many materials that may be useful as probe materials.

Referring back to FIG. 1, although the example apparatus 100 illustrated in this figure shows the first location 121 (where the vibration is introduced into the probe 102) as being within the lower region 106 of the probe, and it shows the second location 123 (where the vibration sensor 122 senses the arrival of the vibration) as being within the upper region 104 of the probe, those of skill in the art will appreciate that many other useful configurations are possible. By way of example and not limitation, FIGS. 2-4 illustrate just a few of the many potentially useful configurations.

Figure 2:
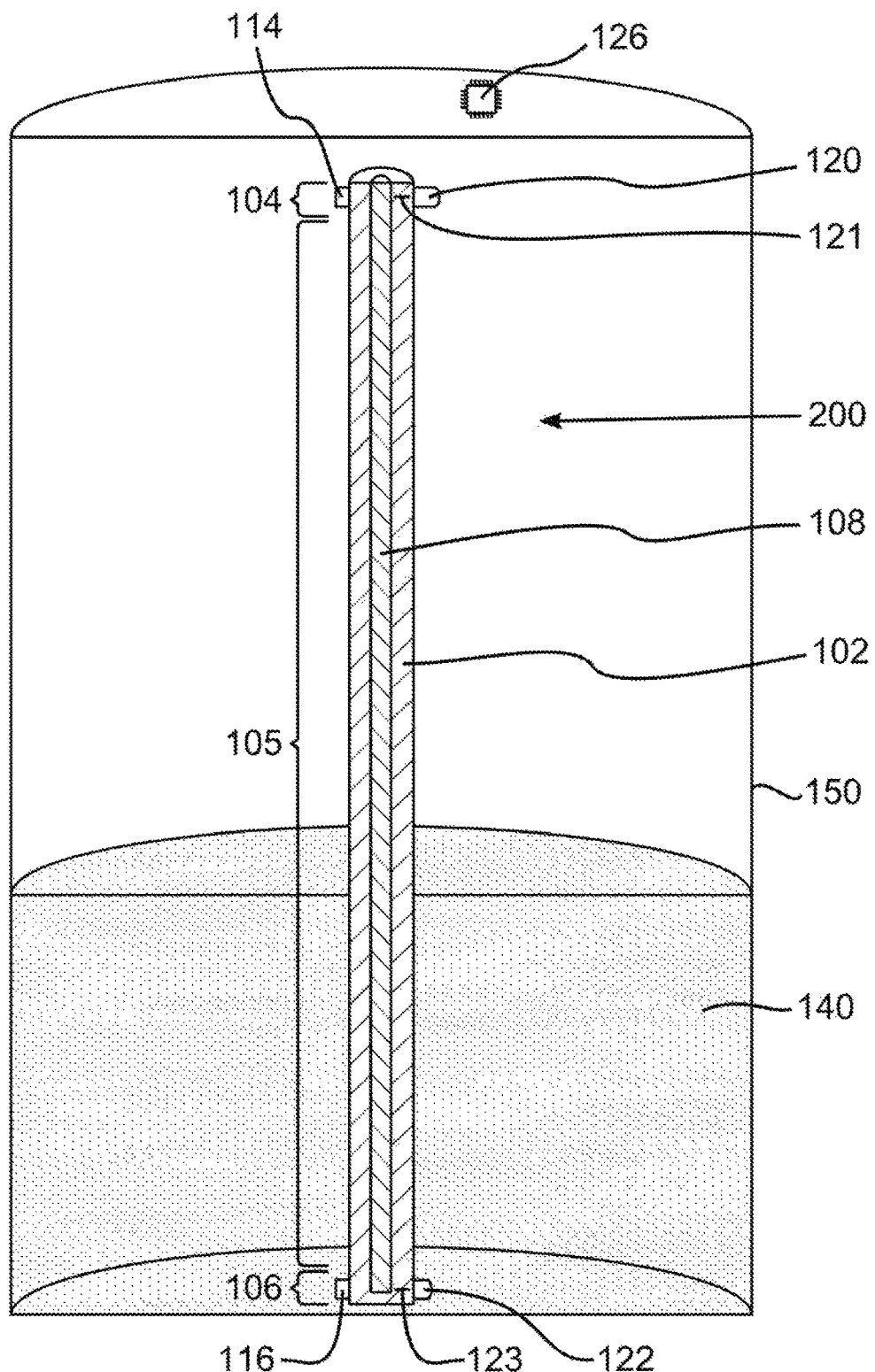

In particular, FIG. 2 illustrates an apparatus 200 in which the first location 121 is located within the upper region 104 of the probe 102 and the second location 123 is located within the lower region 106 of the probe 102. Note also that the electrical circuitry 126 illustrated in FIG. 2 may employ wireless connections in place of the wired connections illustrated in FIG. 1.

Figure 3:
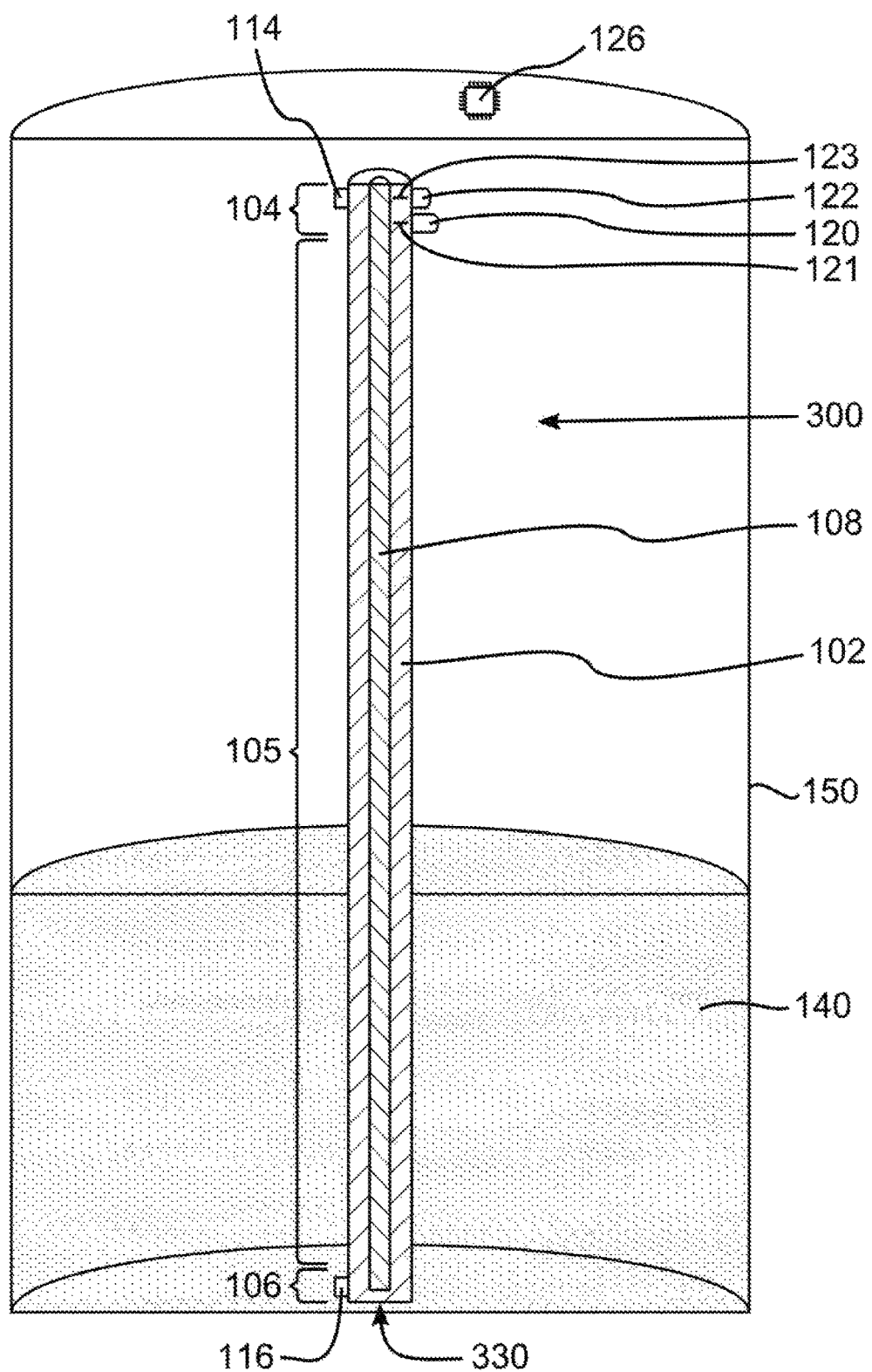

FIG. 3 illustrates an apparatus 300 in which both the first location 121 and the second location 123 are located within the upper region 104 of the probe 102. In this configuration, the vibration sensor 122 may be configured to sense the arrival of the vibration after the vibration has propagated downward from the first location 121 in the upper region 104 of the probe to a reflection point 330 in the lower region 106 of the probe and then back upward to the second location 123 in the upper region 104 of the probe. The reflection point 330 may be the physical end of the probe 102, as illustrated in this example, or it may be any other structure that effectively reflects the vibration. An advantage of this configuration is that the propagation distance of the vibration may be greater than in the previous example configurations, which can potentially improve the accuracy and precision of the resulting liquid level measurement.

Figure 4:
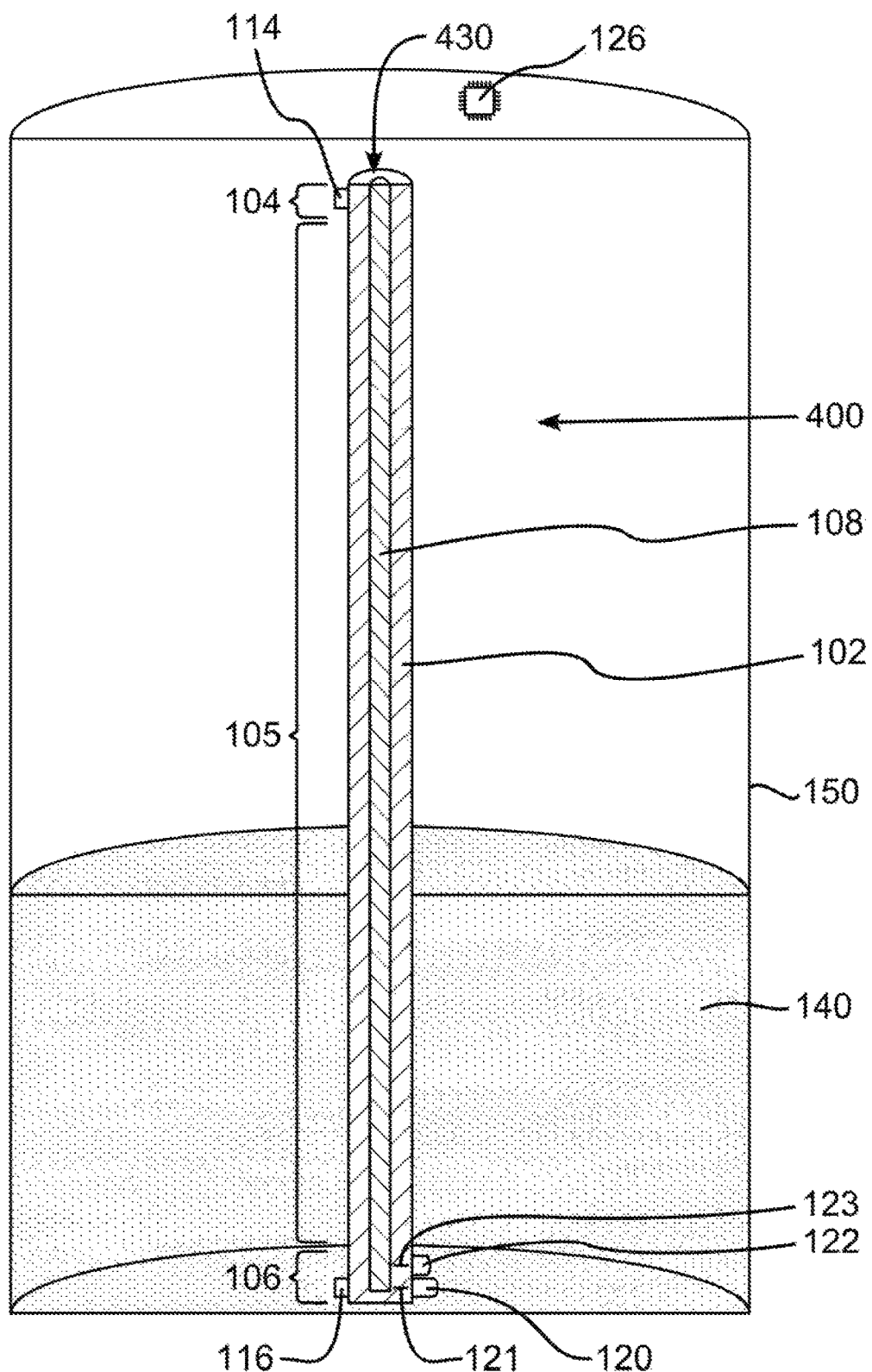

FIG. 4 illustrates an apparatus 400 in which both the first location 121 and the second location 123 may be located within the lower region 106 of the probe 102. The view of FIG. 4 is a cross section taken at 500-500 in FIG. 5. In this configuration, the vibration sensor 122 may be configured to sense the arrival of the vibration after the vibration has propagated upward from the first location 121 in the lower region 106 of the probe to a reflection point 430 in the upper region 104 of the probe and then back downward to the second location 123 in the lower region 106 of the probe. Those of skill in the art may appreciate that there are many other potentially useful configurations employing this principle of reflected vibrations, which need not be limited to a single reflection. Indeed, employing multiple reflections may improve the accuracy and/or precision of the resulting liquid level measurement by potentially improving the accuracy and/or precision of the measurements of propagation distance $d_{total}$ and propagation time $t_{total}$. Another potential advantage of configurations employing reflected vibrations is that the actuator 120 and the vibration sensor 122 may comprise the same device, in which case the first location 121 and the second location 123 would be coincident. By way of example and not limitation, a single piezoelectric element may be used for both the actuator 120 and the vibration sensor 122.

Figure 5:
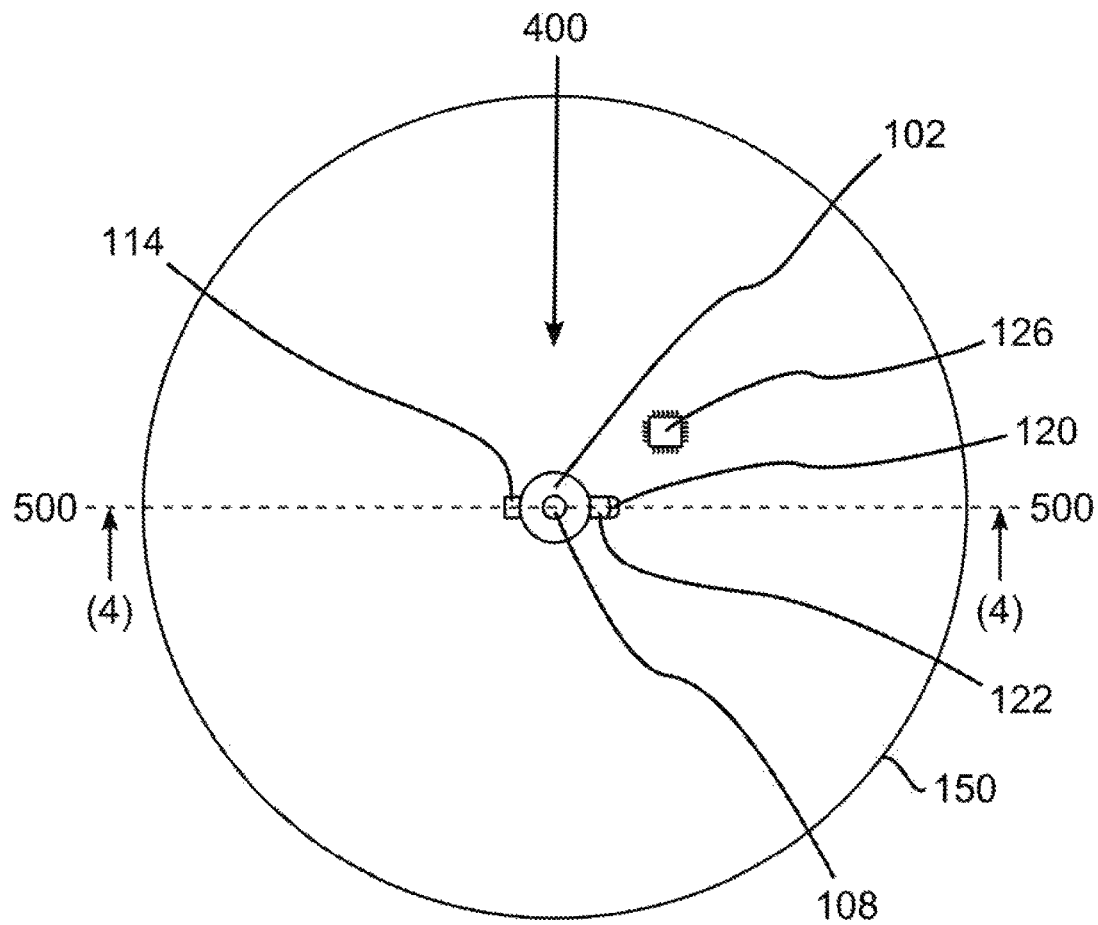
FIG. 5 illustrates a top plan view of the apparatus depicted in FIG. 4. After comparing the relationship between FIG. 5 to FIG. 4, one skilled in the art would be able to understand that the sectional views depicted in FIG. 1 through 3 are derived from corresponding top plan views of a generally cylindrical probe, the corresponding top plan views not being depicted.

FIG. 5 depicts a top perspective view of the apparatus show in FIG. 4, except no liquid is depicted.

For FIG. 4, any numbered elements that are depicted in FIG. 4 but not described in the description of FIG. 4, the previous descriptions for those numbered elements in FIGS. 1-3 may be applied. For FIG. 3, any numbered elements that are depicted in FIG. 3 but not described in the description of FIG. 3, the previous descriptions for those numbered elements in FIGS. 1-2 may be applied. For FIG. 2, any numbered elements that are depicted in FIG. 2 but not described in the description of FIG. 2, the previous descriptions for those numbered elements in FIG. 1 may be applied.

Those of skill in the art will also appreciate that there are many potentially useful probe designs and configurations. The most basic design would be a straight rod with a circular cross section, as illustrated in the foregoing drawings, but many other cross-sectional shapes may be advantageously employed, either along the entire length of the probe or just a portion thereof. Further, the probe need not be straight. By way of example and not limitation, a probe in the shape of a helix may be advantageous in that it may provide greater propagation distance $d_{total}$ and propagation time $t_{total}$, which can potentially improve the accuracy and/or precision of the resulting liquid level measurement.

Any calculations may be performed by electrical circuitry which includes circuit boards or computer servers known in the art.

While the invention has been shown in the drawings and described above with particularity and detail in connection with what are presently deemed to be some of the more practical and preferred embodiments of the invention, these embodiments are illustrative only and are not intended to be exhaustive or to limit the invention to the forms disclosed. It will be apparent to practitioners skilled in the art that numerous variations, combinations, and equivalents can be devised without departing from the principles and concepts of the invention as set forth herein. The invention should therefore not be limited by the above-described embodiments, methods, and examples, but by all embodiments and methods that are within the scope and spirit of the invention as disclosed and claimed.

We claim:

1. A method of measuring a level of a liquid, comprising the steps of:
    (a) providing an elongated probe comprising a thermally conductive material, said probe comprising an upper region to be disposed above the surface of the liquid, a lower region to be disposed below the surface of the liquid, and a middle region between the upper region and the lower region;
    (b) disposing the upper region of the probe above the surface of the liquid and the lower region of the probe below the surface of the liquid;
    (c) adding heat to the probe to raise the average temperature along the length thereof;
    (d) measuring a temperature of the probe in the upper region and a temperature of the probe in the lower region;
    (e) after electrical circuitry has determined that a difference between the measured temperature of the probe in the upper region and the measured temperature of the probe in the lower region has reached a predetermined value, introducing a vibration into the probe at a first location along the length of the probe;

(f) sensing the arrival of the vibration at a second location along the length of the probe;

(g) measuring a propagation time of the vibration as a time delay between the introduction of the vibration into the probe at the first location and the arrival of the vibration in the probe at the second location; and (h) computing the level of the liquid as a function of a distance the vibration propagated through the probe to get from the first location to the second location, the measured propagation time, the measured temperature of the probe in the upper region, the measured temperature of the probe in the lower region, and a known temperature dependence of a speed of propagation of the vibration along the probe.

2. The method of claim 1, wherein the computation in step (h) accounts for thermal expansion experienced by the probe.

3. The method of claim 1, further comprising an equilibration step wherein heat addition is stopped and the probe is allowed a period of time for local temperature equilibration before final temperature measurements are made and the vibration is introduced into the probe.

4. The method of claim 1, further comprising a calibration step performed by electrical circuitry to characterize the temperature dependence of the speed of propagation of the vibration along the probe.

5. The apparatus of claim 1, wherein the first location is located within the lower region of the probe and the second location is located within the upper region of the probe.

6. The apparatus of claim 1, wherein at least a portion of the probe has a generally circular cross section.

7. The apparatus of claim 1, wherein the thermally conductive material comprises a material selected from the group consisting of brass, stainless steel, steel, and copper.

8. The apparatus of claim 1, wherein adding heat comprises electrical resistance heating.

\* \* \* \* \*

UNITED STATES PATENT AND TRADEMARK OFFICE
CERTIFICATE OF CORRECTION

| | | |
|---|---|---|
| PATENT NO. | : 10,408,661 B2 | Page 1 of 1 |
| APPLICATION NO. | : 15/463764 | |
| DATED | : September 10, 2019 | |
| INVENTOR(S) | : Larry Baxter et al. | |

It is certified that error appears in the above-identified patent and that said Letters Patent is hereby corrected as shown below:

In the Specification

Please add the following paragraph before Line 4 of Column 1, above "TECHNICAL FIELD":
--This invention was made with government support under DE-FE0028697 awarded by the U.S. Department of Energy. The government has certain rights in the invention.--

Signed and Sealed this
Twenty-first Day of November, 2023

Katherine Kelly Vidal
*Director of the United States Patent and Trademark Office*